INVENTOR.
ROBERT R. DENMAN
BY
ATTORNEYS

United States Patent Office 3,133,803
Patented May 19, 1964

3,133,803
METHOD AND APPARATUS FOR CONDITIONING MOLTEN GLASS
Robert R. Denman, Toledo, Ohio, assignor to Owens-Illinois Glass Company, a corporation of Ohio
Filed Jan. 16, 1961, Ser. No. 83,609
5 Claims. (Cl. 65—134)

This invention relates to a method and apparatus for conditioning molten glass for the purpose of providing a supply body thereof from which charges or gobs of molten glass may be fed to a forming unit.

In the normal procedure of handling molten glass in a forehearth feeding device, the forehearth is usually of a parallel wall structure having a symmetrical cross-sectional area throughout its length. Such forehearth is normally provided with an orificial feed opening at its outer end through which charges of molten glass are fed to a container forming unit.

In such forehearths, the volume of the glass throughout the cross-sectional area and through the length of the forehearth is regular or constant. Under such conditions there is a considerable mass or volume of glass contained within the length of a forehearth, which may be 15 or 20 feet in length, and to closely and quickly control the temperature of such a mass of glass is almost an impossibility.

In present commercial operation the temperature of the glass is maintained within very close limits but those limits are still not close and constant enough to completely obviate the production of bad or off ware due to the difficulties which may be caused by temperature variations.

It is an object of this present invention to provide a structure wherein the temperature of the glass, as it is delivered to the areas immediately around and above the delivery orifice, may be quickly and easily controlled.

It is a further object of this invention to obtain such temperature control by regulating the depth of the glass as it passes through a particular area where the temperature thereof may be maintained or varied as the case may demand.

It is also an object of this invention to provide such temperature control by and through the use of heat applied either to the surface of the glass, within the body of the glass, or both.

Further objects may be apparent from the drawings and the following description.

Figure 1:
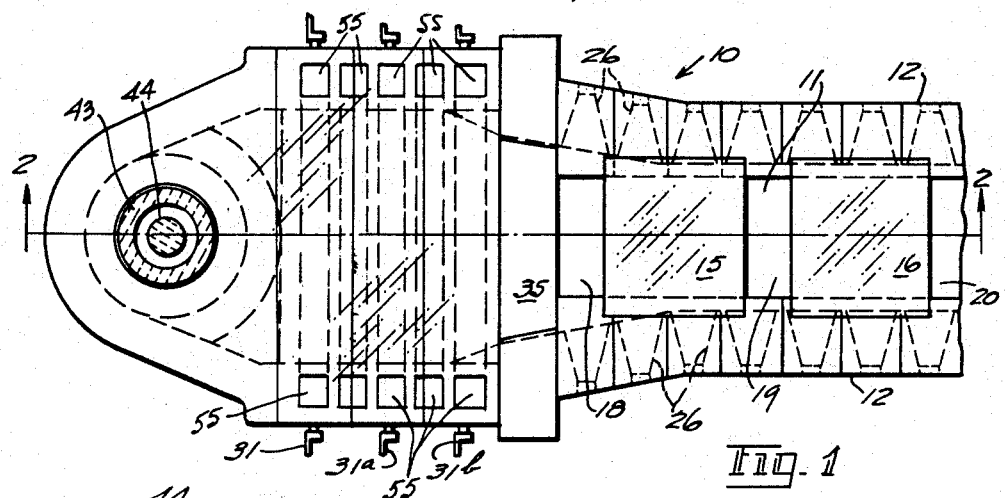
FIG. 1 illustrates a plan view of the charge feeding and of a feeder forehearth showing the variation in and from the normal or regular configuration of feeder forehearths.
Figure 2:
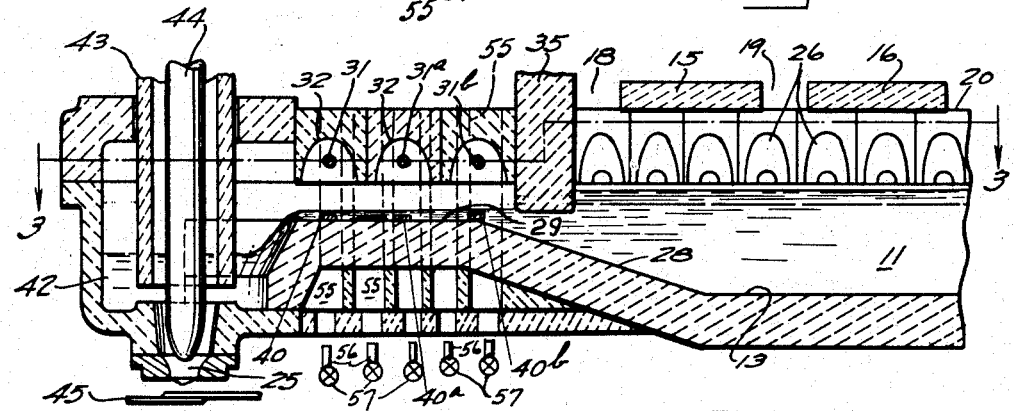
FIG. 2 is a section elevation taken at line 2—2 on FIG. 1 and illustrates the manner in which the depth of the glass is regulated and controlled.

Referring to FIGS. 1–3, 10 illustrates the outer end of a feeding forehearth which normally extends outwardly from a glass melting tank and which is comprised of a channel 11 provided with side walls 12 and a bottom 13. The major portion of the length of said channel 11 will be of a regular or constant cross sectional area. Roof blocks 15 and 16 are provided along the top of the channel 11 and are freely mounted so that they may be positioned along the length of the forehearth in any desired pattern. For example, in FIG. 1 these roof blocks are shown spaced apart along the length of the forehearth thereby providing roof openings 18, 19 and 20 to permit the escape or loss of heat from the body of molten glass passing through the channel 11, thereby to provide some measure of temperature control necessary during the passage of molten glass through the channel. By varying the spacing between these roof blocks the loss or retention of heat may be varied.

Usually it is necessary to decrease the temperature of the molten glass during its passage from the refiner to the discharge orifice 25, at the forward end of the feeder, and in order to do so with some measure of control, it is usually necessary to apply surface heat to the glass as it passes through the channel 11.

In such instances burners 26 are provided along both sides of the channel in opposed horizontal relationship and thereby provide a controllable blanket of heated gases above and along the surface area of the molten glass passing through channel 11. These burners 26 in combination with the roof blocks 15 and 16 provide a good measure of temperature control to the glass in channel 11, but this control does not provide the rapid or fine control desired or contemplated by this present invention.

Consequently, at a position along the length of the forehearth, the floor 13 thereof, is inclined upwardly as at 28, and to a level such as shown at 29, to thereby provide an area or volume of the glass, moving through the forehearth channel, which is of a comparatively shallow depth or of reduced vertical cross section.

Figure 3:
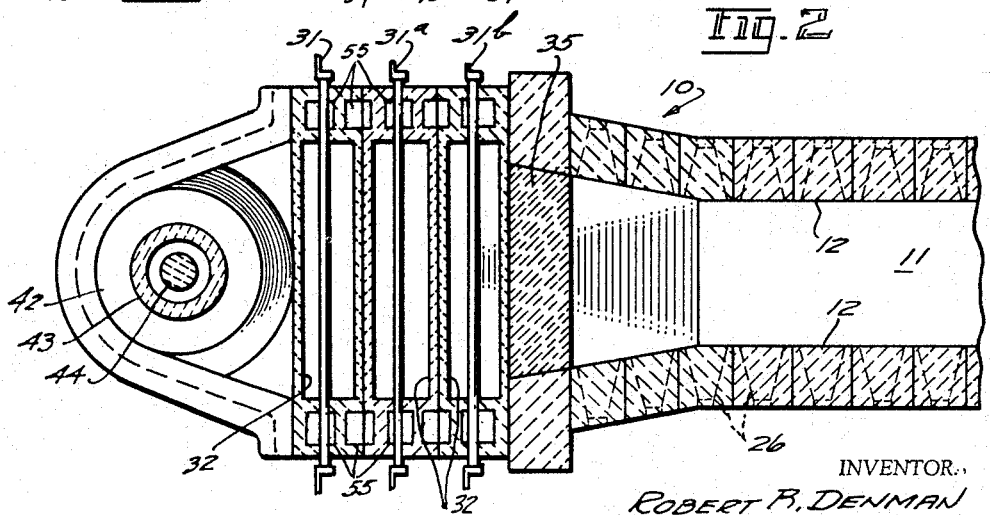
FIG. 3 is a sectional plan view taken at line 3—3 on FIG. 2 illustrating the means for applying heat to the surface areas of the glass passing through the shallow portion of the forehearth.

As can readily be seen when viewing FIGS. 1 and 3, the floor of the forehearth at 29 becomes substantially level and at the same time, is widened considerably. Under optimum conditions and dimensions of the channel 11, the rate of flow of the molten glass through the forehearth channel will be constant throughout its entire length. The rate at which the mold charges are formed at the discharge orifice 25, determines the pull or volume of molten glass per unit of time being discharged and also determines the actual volume rate of flow through the channel. By providing a conditioning section within the forehearth channel in advance of the discharge orifice 25, it is possible to control the temperature of the glass to a greater degree than was possible in the prior art arrangement described above. Furthermore, by widening the channel within this conditioning section, it is possible to maintain the volume rate of flow substantially constant at any point along the length of the forehearth.

The purpose of such shallowing of the glass is to provide a condition whereby heat supplied to the surface thereof, for example, by electrical heating units such as the units 31, 31a, and 31b in conjunction with their parabolic reflectors 32 or any other heating means, may provide any additional required heat to the glass in this shallow area. Due to the fact that the glass is shallow, the heat soak into its depth will be rather rapid and thus the temperature of this mass of glass may, for example, be rapidly increased the desired number of degrees to give a desirable and controllable temperature for some specific gob temperature required in the manufacture of a specific type of article.

Cooperating with these heating members is a skimmer block 35 which is adapted for vertical adjustment by any of the usual or well-known means for such adjustment. The positioning of this skimmer block may be automatically controlled, for example, in accordance with a co-pending application Ser. No. 621,356, filed November 9, 1956, now Patent No. 2,999,511. Through the use of this adjustable block, the depth of the glass flowing over the forehearth floor at 29 may be increased or decreased in accordance with the volume of the glass required for the specific article or articles being produced. In this manner, the speed with which the glass may be heated or cooled may be effected in accordance with the desired operating conditions. Additionally, the reduction of the supplied heat at this point, with or without the change in glass depth will aid in dropping the temperature of the glass in this shallow area.

In addition to the surface heating elements, a series of heating elements 40, 40a and 40b may be submerged in the shallow body of glass over the floor area 29 and these elements may be operated either singly, in pairs, or groups, as the required temperature conditions may dictate. Such operation is also true with respect to the heating elements 31, 31a and 31b. In fact, all of these heating elements may be automatically controlled by any of the usual or well-known control means.

A series of coolant passages 55 are provided at the shallow area of the channel in order to permit cooling below that obtainable merely by discontinuing the heating means. The coolant for passages 55 may be provided from a source (not shown) through pipes 56 each of which may be provided with valved control, such as valves 57.

From the preceding it should be apparent that control of the temperature of the molten glass is provided for the body of glass in the forehearth 10 throughout its entire travel therethrough and that, as the glass approaches the delivery well 42 of the forehearth, a critical temperature may be obtained and maintained as it passes through and over the shallow portion 29 of the channel 11 on its way to the well 42. After it is received in the well, the usual stirring sleeve 43 maintains the uniformity of temperature of the glass in the well and the usual plunger 44 is actuated in the normal manner to project charges of glass through the orifice 25. With the issuance of the glass from the orifice 25 shear members 45 are adapted to be actuated in the usual manner to sever the charges of glass for feeding to the forming machine.

From the foregoing descriptive material it should be quite apparent that the temperature of the body of glass in the well 42 may be readily and quickly controlled and equalized so that the temperature of the gobs as delivered to the molding machine may be constant and equalized throughout the gobs. Furthermore, the volume rate of flow of glass from the refiner to the discharge orifice will be substantially constant at any point along the length of the forehearth.

This application is a continuation-in-part of my copending application Ser. No. 686,686, filed September 27, 1957, now abandoned.

Various modifications may be resorted to within the spirit and scope of the appended claims.

I claim:
1. In an apparatus for conditioning molten glass, the combination of a feeder forehearth, a glass conveying channel therein adapted to convey molten glass, said channel being provided with an outlet orifice at its outer end, said channel extending through the length of said forehearth and having the major portion of its length of constant cross-sectional area, a portion of said channel in advance of the outlet orifice being of reduced depth and increased width, a skimmer block adapted to control the volume and level of glass flowing through said reduced depth area, and heater means in said reduced depth and increased width area for maintaining a constant temperature in the glass flowing therethrough.

2. In an apparatus for conditioning molten glass, the combination of a feeder forehearth, a glass conveying channel therein adapted to convey molten glass, said channel being provided with an orifice well at its outer end, said channel extending through the length of said forehearth and having the major portion of its length of constant cross-sectional area, a portion of said channel in advance of the orifice well being of reduced depth and increased width, a skimmer block adapted to control the volume of glass flowing through said reduced area, means adapted to apply reflected heat exteriorly of said glass in said reduced area, means to apply heat interiorly of the glass in said reduced area both said heat means adapted to maintain a constant temperature in the glass flowing therethrough and means to maintain an equilization of said temperature in the glass beyond said reduced area.

3. The method of controlling the temperature of a moving stream of molten glass comprising first flowing molten glass through a zone of controlled heat applied to the surface of said flowing glass, continuing the flow of said molten glass through a zone of increased surface area and decreased depth and applying heat at said zone internally and externally of said glass in said zone of reduced depth.

4. The method in accordance with claim 3 wherein said externally applied heat is reflectively applied to the surface area of said molten glass while in the zone of reduced depth.

5. A forehearth feeder comprising a glass conveying channel of substantial length, said channel being provided with an outlet orifice at its outer end, said channel extending throughout the length of said forehearth and having a major portion of its length uniform in cross-section, a lesser portion of said channel in advance of the outlet orifice having its bottom surface raised with respect to the bottom of the said major portion and its side walls spaced apart to a greater extent than the side walls of said major portion and means in said lesser portion adapted to apply reflected and immersion heating to said molten glass whereby the temperature of said glass may be readily controlled and the volume rate of flow through said channel is linearly constant.

References Cited in the file of this patent

UNITED STATES PATENTS

| | | |
|---|---|---|
| 2,144,973 | Honiss | Jan. 24, 1939 |
| 2,773,111 | Arbeit et al. | Dec. 4, 1956 |

FOREIGN PATENTS

| | | |
|---|---|---|
| 653,847 | Great Britain | May 30, 1951 |